June 6, 1933.    E. W. PATTERSON    1,912,494
SWIVEL JOINT CONSTRUCTION
Original Filed Jan. 28, 1931
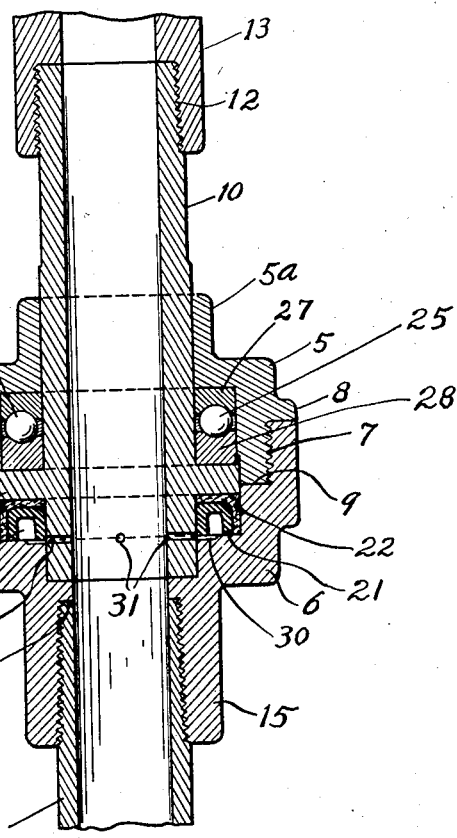
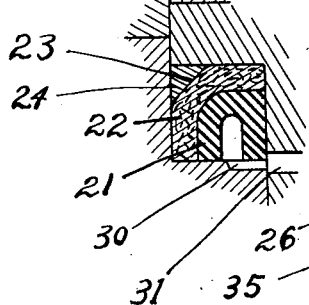
INVENTOR.
Edgar W. Patterson
BY Robt. W. Pearson
ATTORNEYS.

Patented June 6, 1933

1,912,494

UNITED STATES PATENT OFFICE

EDGAR W. PATTERSON, OF LOS ANGELES, CALIFORNIA, ASSIGNOR TO LACY OIL TOOL COMPANY, OF LOS ANGELES, CALIFORNIA, A CO-PARTNERSHIP COMPRISED OF WALTER P. LACY, WILLIAM G. LACY, AND CONRAD A. STILES

SWIVEL JOINT CONSTRUCTION

Application filed January 28, 1931, Serial No. 511,774. Renewed December 9, 1932.

This invention relates to an improved swivel joint construction for piping to prevent leakage between two sections of pipe which are secured together in such a manner as to permit them to turn in an axial manner with relation to each other.

The invention is particularly intended for use in piping to conduct liquid under pressure in order to prevent leakage of such liquid from the pipe at its joints. It is well adapted for use as a substitute for the standard pipe swivels shown in my copending application for patent on "Flexible pipe assembly", filed June 6, 1926, Ser. No. 368,937.

An object of the invention is to provide a superior arrangement of packing elements within the joint, said packing elements being so constructed and arranged with relation to the joint as a whole that increase of hydraulic pressure within the pipe expands the packing in such a way as more effectively to prevent any leakage.

Another object of the invention is to provide a simple yet exceedingly strong pipe swivel construction which will be adapted to prevent leakage even when the interior of the joint is subjected to an enormous hydraulic pressure.

Other objects and advantages relate to a simplified and generally improved arrangement of the means for holding the packing in place and for assembling and disassembling the joint structure.

A further object of the invention is to provide a pipe swivel joint construction which will reduce the friction caused by the relative turning of the pipe sections and yet will effectively prevent leakage therebetween.

Still other objects, advantages and features of the invention may hereinafter appear.

Referring in detail to the drawing, the device comprises a separable housing consisting, as viewed in the drawing, of an upper section 5 and a lower section 6. These sections are of an annular or tubular character, one of them being screwed into the other as indicated at 7. The upper section 5 is provided with a peripheral rib or flange 8 which abuts against the upper end of section 6 when the parts are screwed together, and the lower section 6 is provided with an internal annular shoulder 9 which likewise abuts against the lower end of the upper section 5.

Said separable sections 5 and 6 are of the nature of combined housing sections and pipe couplings, a third coupling member 10 being provided which is of a tubular nature and has, a short distance from its lower end, a peripheral flange 11 which fits closely within the members 5 and 6 opposite to the shoulder 9 of the latter member. Said member 10 has a close but rotatable fit within an upwardly extending flange or sleeve 5a with which the member 5 is provided. The upper end of said third member 10 has a screw threaded connection 12 with an upper pipe section 13, and the lower end of the coupling member 6 is provided with a downwardly extending internally threaded flange or sleeve portion 15 into which screws a lower pipe section 16.

Where the sleeve portion 15 joins the body portion of the housing section 6 an internally projecting annular flange 15a is provided, the internal diameter of which is the same as the internal diameter of the pipe sections 10 and 16. Immediately above said flange 15a the internal diameter of the housing section 6 is sufficiently enlarged to have the lower end of the pipe section 10 fitted rotatably thereinto.

The separable coupling members 5 and 6 enclose a packing and ball bearing chamber 20 which the flange 11 of pipe section 10 divides into upper and lower sections. Within the lower chamber thus formed is fitted the internal packing ring 21 which, as viewed in cross section, is of an inverted U-shape.

Against the upper and outer surfaces of said packing ring is fitted an external packing ring 22, which as viewed in cross section, is of an inverted approximately L-shape. The internal packing ring 21 is desirably formed of rubber and the external packing ring 22 may be a relatively thick strip of leather or of a suitable fabric or fabricated structure. The invention, however, is not limited to the particular material of which either of these packing rings is composed.

As best shown in Fig. 2 the external angle of the packing ring 22 is bevelled away at 23 in order to provide room for the insertion of an annular metallic filler ring 24 which is triangular in cross section.

Into the upper portion of chamber 20 is fitted a ball bearing which comprises the series of bearing balls 25, the cage 26, the upper bearing ring 27 and the lower bearing ring 28. The ball bearing structure shown is preferred; but when very heavy work is to be done by the device, rollers may be substituted for the balls without departing from the spirit of the invention.

In order to insure that pressure from the interior of the pipe will be admitted to the annular space between the limbs of the inner packing ring 21, a series of grooves 30 may be provided as shown, there being a series of ducts 31 provided through the wall of the lower end portion of pipe section 10 which when the parts are assembled lie in the same plane with said grooves 30. Around the outside of the pipe section 10 extends a groove 33 with which all of said ducts 31 communicate, said groove being in communication with the grooves 30 which underlie the packing ring 22.

The lower end portion of the housing section 8 preferably has its internal diameter slightly enlarged at 35, the diameter thereof at this place being substantially the same as the internal diameter of the lower housing section 6 opposite to the packing rings.

In order to assemble the device, the ball bearing elements may first be inserted within the housing section 5 while said section is held in an inverted position, whereupon the pipe coupling section 10 is inserted through the large end of the housing section 5, the flange 11 of said pipe section being then brought down into contact with the ball bearing ring 28. The packing rings 21 and 22 are then put in place within the housing section 6 after which the housing section 5, together with the pipe coupling member 10, may be brought into the position shown in Fig. 1, the housing sections 5 and 6 being screwed together until the lower end of the housing section 5 engages the internal shoulder 9 of the section 6. After this has been done the pipes 13 and 16 to be connected by the swivel joint may be screwed thereonto as shown.

It will be seen that the peripheral flange 11 of the conduit portion 10 forms one wall of the annular packing chamber, and that the radial limb of the L-shaped packing ring 22 abuts against one side of this flange, the anti-friction bearing construction abutting against the opposite side of said flange. This arrangement provides a very compact and serviceable bearing and packing construction.

During use the fluid pressure within the device will creep under the packing rings 21 and 22 and will tend to force the flange 11 of pipe joint section 10 against the lower bearing ring 28. The pressure between the limbs of the U-shaped packing member 21 will tend to spread said ring thereby not only crowding the inner side of said ring against the pipe joint section 10, but causing the outer side of said ring to crowd against the adjacent outer limb of the annular portion of the packing thus preventing leakage at that side of the packing also.

The annular ring 24 which is tri-angular in cross section fills in the angular recess at the place where it is inserted, and therefore along the circular space which it occupies obliterates the sharp corner which otherwise might be left unoccupied, because it could not readily be filled in by the outer packing ring 22. Said annular ring 25 prevents the formation of a sharp corner in the sheet of packing material opposite thereto, and therefore adds to the life of the packing material which is more apt to break if bent at an angle of 90 degrees than it is to be injured as it is flexed at a more obtuse angle.

I claim:

1. In a packing construction, a housing portion, a conduit portion having a working fit within said housing portion, there being an annular chamber provided between said conduit portion and said housing portion, said chamber being substantially rectangular in cross section, an outer packing ring which is L-shaped in cross section and which has its corner portion directed outwardly into a corner portion of said annular chamber, one limb of said L-shaped ring abutting against a side of said annular chamber and the other limb thereof abutting against the periphery of said annular chamber, an inner packing ring having an outer corner portion abutting against the inner surface of the flexed portion of said L-shaped packing, and a filler ring occupying the corner portion of said annular chamber toward which the outer angle of said L-shaped ring is directed, said filler ring abutting against the aforementioned side of said annular chamber which is engaged by said packing ring and preventing the formation of a sharp corner in the packing ring which abuts thereagainst.

2. In a packing construction, a housing portion, a conduit portion having a working fit within said housing portion, there being an annular chamber provided between said conduit portion and said housing portion, said conduit portion having a peripheral flange which divides said annular chamber into a packing chamber and a bearing chamber, an outer packing ring within said packing chamber, said packing ring being L-shaped in cross section and having one of its limbs abutting against one side of said peripheral flange, said packing ring having a corner portion directed outwardly into a corner portion of said packing chamber, a bearing construction abutting against the side of said peripheral flange opposite to said packing ring, an inner packing ring having an outer corner portion abutting against the inner surface of the flexed portion of said L-shaped packing, and a filler ring occupying the corner portion of said annular chamber toward which the outer angle of said L-shaped ring is directed, said filler ring abutting against the aforementioned side of said peripheral flange which is engaged by said packing ring and preventing the formation of a sharp corner in the packing ring which abuts thereagainst.

In testimony whereof I hereunto affix my signature.

EDGAR W. PATTERSON.